(12) United States Patent
Clement et al.

(10) Patent No.: US 11,983,513 B2
(45) Date of Patent: *May 14, 2024

(54) MULTI-LINGUAL CODE GENERATION WITH ZERO-SHOT INFERENCE

(71) Applicant: MICROSOFT TECHNOLOGY LICENSING, LLC., Redmond, WA (US)

(72) Inventors: Colin Bruce Clement, Seattle, WA (US); Shuai Lu, Beijing (CN); Neelakantan Sundaresan, Bellevue, WA (US); Alexey Svyatkovskiy, Bellevue, WA (US); Duyu Tang, Beijing (CN)

(73) Assignee: MICROSOFT TECHNOLOGY LICENSING, LLC., Redmond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,535

(22) Filed: May 24, 2023

(65) Prior Publication Data

US 2023/0359443 A1  Nov. 9, 2023

Related U.S. Application Data

(63) Continuation of application No. 17/978,627, filed on Nov. 1, 2022, now Pat. No. 11,693,630, which is a
(Continued)

(51) Int. Cl.
*G06F 8/33* (2018.01)
*G06F 8/41* (2018.01)
(Continued)

(52) U.S. Cl.
CPC ............ *G06F 8/33* (2013.01); *G06F 8/44* (2013.01); *G06F 18/211* (2023.01); *G06F 18/213* (2023.01); *G06N 3/088* (2013.01)

(58) Field of Classification Search
CPC . G06F 8/33; G06F 8/44; G06F 18/211; G06F 18/213; G06N 3/088
See application file for complete search history.

(56) References Cited

U.S. PATENT DOCUMENTS

2015/0135166 A1* 5/2015 Tarlow ................ G06F 11/3604
717/124
2017/0212829 A1* 7/2017 Bales .................. G06F 11/3604
(Continued)

OTHER PUBLICATIONS

Veselin Raychev, "Code completion with statistical language models", Jun. 2014, pp. 419-428 (Year: 2014).*
(Continued)

*Primary Examiner* — Wei Y Zhen
*Assistant Examiner* — Amir Soltanzadeh

(57) ABSTRACT

A neural transformer model with attention is trained to predict candidates to complete a line of source code with a zero-inference capability. The model is trained on an unsupervised training dataset that includes features from source code written in multiple programming languages. The features include a file-level context and a local context, where the file-level context includes a global context, a class context, a function context, and/or a method context for each class, function and/or method of the source code programs used in the training dataset. The local context includes method bodies, function bodies, and/or stand-alone code of main method routines. From these features, the model is able to learn to predict an ordered sequence of code elements that complete a line of source code in a programming language seen and not seen during training.

18 Claims, 10 Drawing Sheets

Related U.S. Application Data continuation of application No. 17/140,091, filed on Jan. 3, 2021, now Pat. No. 11,513,774.

(51) Int. Cl.
  *G06F 18/211* (2023.01)
  *G06F 18/213* (2023.01)
  *G06N 3/088* (2023.01)

(56) References Cited

U.S. PATENT DOCUMENTS

2020/0327118 A1* 10/2020 Ahmed .................... G06N 3/08
2021/0373857 A1* 12/2021 Man ........................ G06N 5/01

OTHER PUBLICATIONS

Shuai Wang, "Deep Learning Based Code Completion Models for Programming Codes", Sep. 2019, Article No. 16, pp. 1-9 (Year: 2019).*

Tabachnyk, et al., "ML-Enhanced Code Completion Improves Developer Productivity", Retrieved From: https://blog.research.google/2022/07/ml-enhanced-code-completion-improves.html, Jul. 26, 2022, 6 Pages.

* cited by examiner

MULTI-LINGUAL CODE GENERATION WITH ZERO-SHOT INFERENCE

CROSS-REFERENCE TO RELATED APPLICATION

The present application is a continuation of U.S. Pat. No. 11,693,630 filed on Nov. 1, 2022, which is a continuation of U.S. Pat. No. 11,513,744, filed on Jan. 3, 2021, both of which are hereby incorporated by reference herein in their entirety.

BACKGROUND

Software development environments are often used to aid software developers (i.e., users, programmers, etc.) to develop program code. The software development environment may include a source code editor and other tools that a developer utilizes to write and test their programs. Some software development environments include a code completion feature that provides assistance while the developer is editing code by automatically presenting a list of possible candidates based on one or more characters (e.g., letters, symbols, etc.) that a developer has typed into the source code editor. A popup menu may appear with several suggested code elements that the developer may utilize. This assistance is beneficial since it speeds up the development time and reduces common errors, such as typos.

However, the automatic code completion feature is only beneficial when the code completion feature recognizes the programming language being developed in the software development environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A deep learning model is trained to predict a line of source code written in both programming languages from the training dataset and unseen programming languages. In one aspect, the deep learning model is a neural transformer model with attention. The neural transformer model is trained on training datasets that include a file context and a local context from various source code programs written in multiple different programming languages. The file context includes a global context, a class context, and a method context. The model learns from the training datasets to recognize patterns that are then used to predict code elements that can complete a line of source code written in a programming language that was not part of the training dataset.

In one aspect, the deep learning model is configured as a neural transformer model with attention having only decoder blocks. A decoder block is configured with a masked multi-head attention layer, and a feed-forward neural network layer with intervening layer normalization layers. The model size is reduced using model distillation and model quantization prior to deployment into a code completion system.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
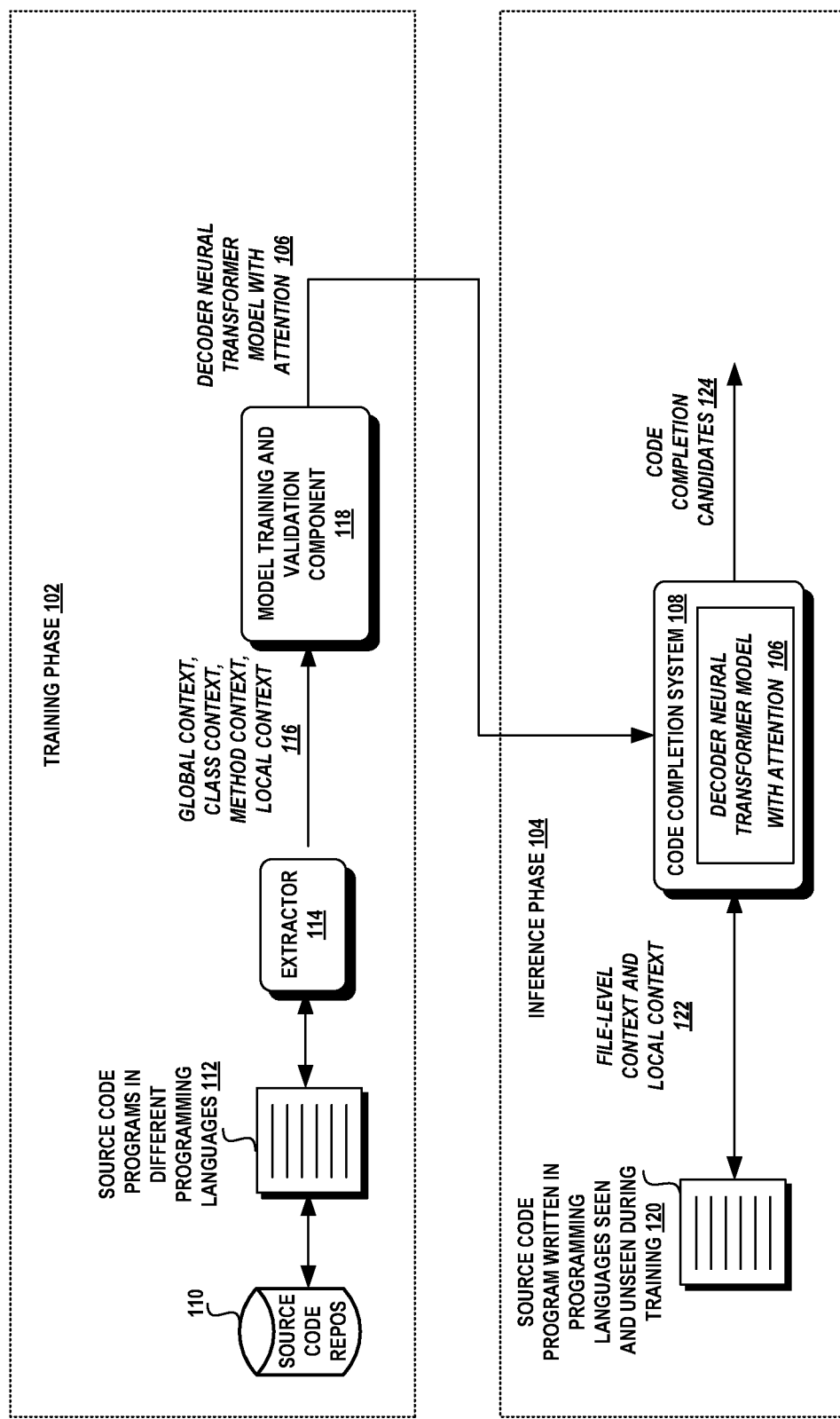
FIG. 1 illustrates an exemplary code completion system having a training phase that generates a neural transformer model and an inference phase that uses the neural transformer model to predict one or more candidate sequences to complete a line-of-code.

The subject matter disclosed pertains to the generation of a neural transformer with attention that learns to predict one or more candidates to automatically complete a line of source code with zero shot inference capability. Code completion is a tool that attempts to predict the next string of characters that a developer (e.g., user, end-user, programmer, etc.) may type into a source code editor. The next string of characters may be any element in a line of source code or the entire line of source code. The code completion tool uses a neural transformer model with attention to predict the next string of code elements to complete a line of source code. A line of source code refers to a physical line of source code that ends with an end-of-line character and which excludes blank lines and comment lines.

A line of source code may consist of various elements (e.g., keywords, delimiters, variables, methods, constants, operators, etc.) that are combined in a particular order in accordance with the grammar of the underlying programming language to form an expression. The line of source code may include a method invocation, a program statement, a definition, an expression, etc. A line of source code is a physical line in the text of a source code file that does not include a blank line or a comment line and ends with an end-of-line character.

A line of source code may include multiple expressions. For example, the model can predict the following line of code, res=some_var.foo(a +b.bar( ), blah=False). This predicted line of code is an assignment statement that includes: an assignment of the return result of the method invocation, some.var_foo( ), to the variable res; the invocation of the method, some.var_foo( ); the invocation of the method, b.bar( ); the addition operation, a+b.bar( ); and the assignment operation, blah=FALSE. The model can predict any one of the elements in this line of source code given a portion of the elements in the line of source code, any combination of these elements, or the entire line of source code.

The neural transformer model is trained on an unsupervised dataset that includes source code from different programming languages (i.e., multi-lingual). Unsupervised learning draws samples from datasets consisting of input data without labeled responses. A vocabulary is formed from these datasets that includes tokens and/or subtokens found in the source code files. A token is a single element in the grammar of a programming language such as a keyword, variable name, operator, delimiter, etc.

The neural transformer model with attention (i.e., neural transformer model, model) is trained with training datasets from different programming languages. The neural transformer model with attention is capable of inferring a candidate to complete a line of code written in a programming language that the model was trained on and written in an unseen programming language. Zero shot inference refers to the capability of a machine learning model to learn to make a prediction from data that the machine learning model did not observe during training. In particular, zero shot inference pertains to the capability of a neural transformer model with attention to predict a line of code written in a programming language that the model did not observe during training.

The neural transformer model with attention is trained on training datasets that include features from source code files written in several different programming languages (e.g., Python, C, C++, C #, Java, JavaScript, TypeScript, Ruby, Go, PHP, etc.). The features include a file context and a local context. The file context includes global contexts, class contexts, method contexts, and function contexts. A global context includes global import statements and global variables defined outside of classes and methods (i.e., functions). A class context includes class signatures, class docstrings and class members defined in a constructor. The class context also includes class methods, class method decorators, class method signatures, and class method docstrings. A method context includes method decorators, method signatures, and method docstrings. A function is a method defined outside of a class. A function context includes function signatures, function decorators, and method docstrings.

Unlike a natural language (e.g., English, etc.), programmers use, at times, arbitrary, complex and long names to represent a variable, function or other code elements which may result in an extremely large vocabulary for the model when a large number of source code programs are used to train the model. To reduce the size of the vocabulary, less-frequently occurring tokens are split into subtokens. A subtoken is a portion of a token that is in between a token and a single character. The subtokens are used to account for rare or unseen tokens (i.e., out-of-vocabulary tokens) that may appear in a target source code program. The use of the subtokens allows the model to learn and generate the out-of-vocabulary tokens.

Byte pair encoding is a data compression technique in which most frequently co-occurring pairs of Unicode characters throughout the training source code dataset are substituted with an out-of-vocabulary character. When applied recursively, the byte pair encoding results in an extraction of token/subtokens in sequences of frequently co-occurring Unicode characters. In one aspect, byte pair encoding is used to extract ordered sequences of Unicode characters to form tokens and subtokens from a syntactic representation of the source code programs of the training dataset. An ordered sequence represents a source code fragment having T tokens/subtokens. The ordered sequences of tokens/subtokens are translated into token/subtoken embeddings and positional embeddings which are vector representations of a source code fragment.

In one aspect, the neural transformer model is a multi-layer decoder-only transformer model. A transformer is a neural network architecture that handles dependencies between its input and output with attention and convolution and without using recurrent neural networks (RNN) (e.g., long short-term memory (LSTM) network, Gated Recurrent Units (GRU)). A shortcoming of an RNN-based system is the sequential nature of the RNN where each hidden state relies on the previous hidden state. This makes the RNN-based systems hard to parallelize and unable to take advantage of fast computing devices, such as graphics processing units. Furthermore, RNN-based systems cannot learn long-range dependencies within the input and output sequences for long periods. The transformer overcomes these obstacles with attention. Attention is a mechanism that identifies which parts of an input sequence are relevant to each token/subtoken in the output sequence. The attention mechanism allows the transformer to access the entire input sequence all at once.

In one aspect, the neural transformer with attention is composed of decoder blocks having masked multi-head self-attention layers. The decoder-only neural transformer model with attention is a good fit for autoregressive tasks that predict future behavior based on past behavior.

A beam search is used to generate one or more candidate sequences to complete a line of source code. The beam search uses the probability distribution generated by the neural transformer model to identify the top k tokens/subtokens likely to be the next token or subtoken in a candidate sequence. The beam search expands the search by instantiating new partial sequences using each of the selected tokens/subtokens identified by the neural transformer model's probability distribution. The search continues generating new partial sequences from the top k tokens/subtokens identified by the output distributions from the neural transformer model until the search ends. The search may end when the end-of-line token appears as the most probable next token.

The task of line-of-code sequence completion is to predict a sequence of response tokens/subtokens, $m_t$, $t=0 \ldots N$, conditioned on an ordered sequence of tokens/subtokens $c_t$, $t=0 \ldots T$, corresponding to a context of code snippet C as the product of conditional probabilities by estimating a conditional probability distribution P(Output|Input) as follows: $P(m_0, m_1, \ldots, m_N | c_0, c_1, \ldots, c_T) = \Pi_{i=1}^{N} P(m_i | c_0, c_1, \ldots, c_T, m_0, \ldots m_{i-1})$. In one aspect, a multi-layer decoder neural transformer model with attention is utilized to estimate this probability distribution for a source code corpus using an unsupervised autoregressive (AR) technique. The modeling objective is to maximize the following likelihood:

$$\Sigma_i (\log m_i | c_0, c_1, \ldots c_T, m_{i-k}, m_{i-k+1}, \ldots m_{i-1}; \Theta),$$

where k is the size of the context window, and the conditional probability P is modeled using a neural transformer model with parameters $\Theta$. The parameters may include attention lengths, the number of attention heads, the number of decoder blocks, embedding dimensions, embedding matrices, and the number of hidden units per layer which are trained using a stochastic gradient descent optimization procedure.

The multi-layer decoder-only neural transformer model with attention produces an output distribution over the tokens/subtokens as follows:

$$h_0 = U \cdot W_e + W_p,$$

$$h_l = \text{transformer block}(h_{l-1}), l=1 \ldots n,$$

$$P(C) = \text{softmax}(h_n \cdot W_e^T),$$

where $C = c_{-k}, c_{-k+1}, \ldots, c_{-1}$ is the context vector of tokens/subtokens, n is the number of layers, T is the ordered sequence length, $W_e$ is the token/subtoken embedding matrix and $W_p$ is the position embedding matrix, e represents an embedding for a token/subtoken in the vocabulary, and p represents an embedding for a position of a token/subtoken.

Attention now turns to a further discussion of the system, devices, components, and methods utilized in the generation and use of the multi-lingual neural transformer model with attention and zero shot inference capability.

System

FIG. 1 illustrates a block diagram of an exemplary system 100 in which various aspects of the invention may be practiced. As shown in FIG. 1, system 100 includes a training phase 102 in which the neural transformer model with attention is trained and an inference phase 104 that utilizes the neural transformer model with attention 106 in a code completion system 108. The training phase 102 may utilize one or more source code repositories 110 from which source code programs in different programming languages 112 are extracted. An extractor 114 obtains features from each source code file which include the global context, class context, method context, function context, and local context 116. These features form the training and validation datasets that a model training and validation component 118 uses to train a decoder neural transformer model with attention 106 to learn to predict candidates to complete a line of source code.

In one aspect, the model training and validation component 118 trains the decoder neural transformer model with attention from a diverse corpus of unlabeled source code programs. This is referred to as unsupervised learning since the model draws samples from the input data without labeled responses. The selected source code programs are extracted from one or more source code repositories 110.

A source code repository 110 may be a file archive and web hosting facility that stores large amounts of source code either privately or publicly. The source code repository 110 may be structured as a version control system, such as GIT, Mercurial, etc. The source code programs residing in the source code repositories 110 vary and are written in different programming languages. The selected source code programs come from different domains, such as without limitation, scientific computing, web development, dataflow programming, machine learning, and the like.

In one aspect, the decoder neural transformer model with attention 106 is trained with a large source code dataset consisting of over 75 million source code files written in Python, C, C++, C #, Java, JavaScript, TypeScript, Ruby, Go, PUP, Swift, Lua, Rust, and Scala programming languages.

In the inference phase 104, the decoder neural transformer model with attention 106 is used in a code completion system 108 to predict one or more code completion candidates to complete a line of source code. The code completion system 108 accepts as input a file-level context (i.e., one or more of the global context, class context, method context, function context) and a local context 122 as features 122 from a source code file under development 120. The source code file under development 120 may be written in a programming language that was not part of the training dataset or was part of the training dataset. The code completion system 108 outputs code completion candidates 124 based on the extracted features.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the training phase 102 may be executed in one computing environment and the inference phase 104 may be executed in the same computing environment or in a separate computing environment as the training phase 102. The various computing environments are described in further detail below.

Figure 2:
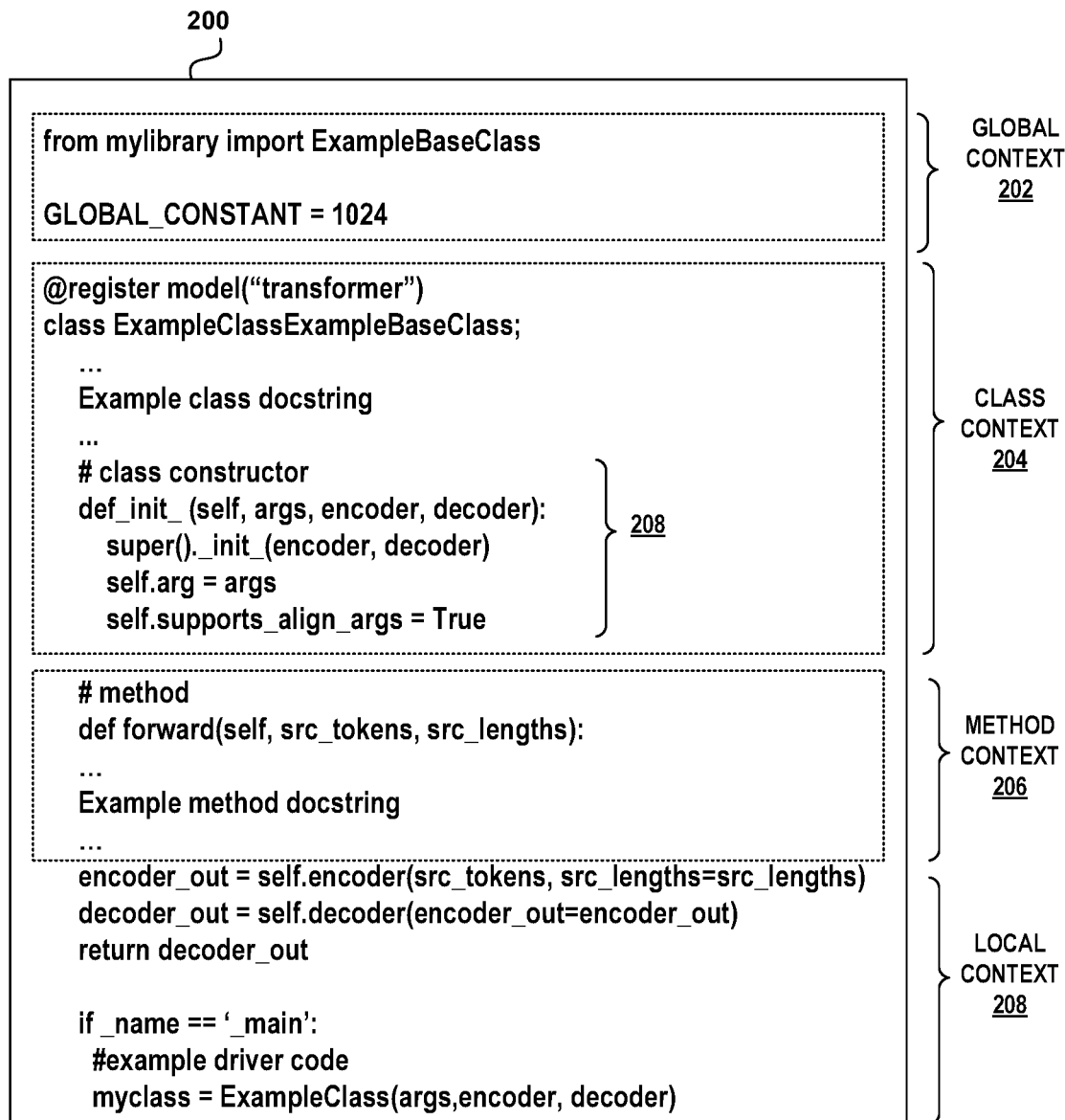
FIG. 2 is an exemplary source code program showing a global context, class context, method context, and a local context.

Attention now turns to FIG. 2 which illustrates the extracted features. In one aspect, the features include file-level features, such as the global context, class context, method context, and/or function context, and a local context. FIG. 2 shows an exemplary portion of a source code program 200 written in the Python programming language. The global context 202 includes import statements and global variables. In source code program 200, the import statement is "from mylibrary import ExampleBaseClass" and a global variable is "GLOBAL_CONSTANT=1024". An import statement is used to import a package or file or classes or interfaces from a package/file into a source code program.

A class in object-oriented programming languages is a template for creating objects and includes initial values for member attributes and variables and member functions or methods. The class context 204 includes a decorator, a class signature, class docstring, and class constructor. In some programming languages, such as Python and TypeScript, a method decorator is special kind of declaration that is attached to a class declaration, method, accessor, property or parameter. A decorator is of the form @expression, wherein expression evaluates to a function that is called at runtime with information about the decorated declaration. A class signature is a list that specifies a class constructor. A class docstring is a string literal that occurs as the first statement in a class definition. A class constructor is a special method that is used to initialize an object.

As shown in source code 200, the class context 204 includes the class decorator "@register model ("transformer")," the class name "ExampleClassExampleBaseClass", the class docstring "Example class docstring" and the class constructor 208.

The method context 206 may include a method signature, a method docstring, and/or a method decorator. A method signature includes the method name and the number, type and order of its parameters. Return types and thrown exceptions are not considered to be a part of the method signature. The method docstring is a string literal that occurs as the first statement in a method definition. As shown in source code 200, the method context 206 includes the method signature "def forward (self, src-tokens, src_lengths)" and the method docstring is "Example method docstring".

In some programming languages, such a Python, there is a distinction between a function and a method. A function is a set of instructions that perform a task outside of a class. The function is not associated with an object, whereas a method is associated with an object in an object-oriented programming language. The function context contains the function signature, the function docstring, and the function decorator. The function context is not shown in FIG. 2.

The local context includes the method bodies, function bodies and the stand-alone code blocks, such as the instructions inside a main method. As shown in FIG. 2, the local context 208 includes the lines of code in the method body of the methodforward.

Attention now turns to a description of an exemplary configuration of a decoder neural transformer model with attention.

Figure 3:
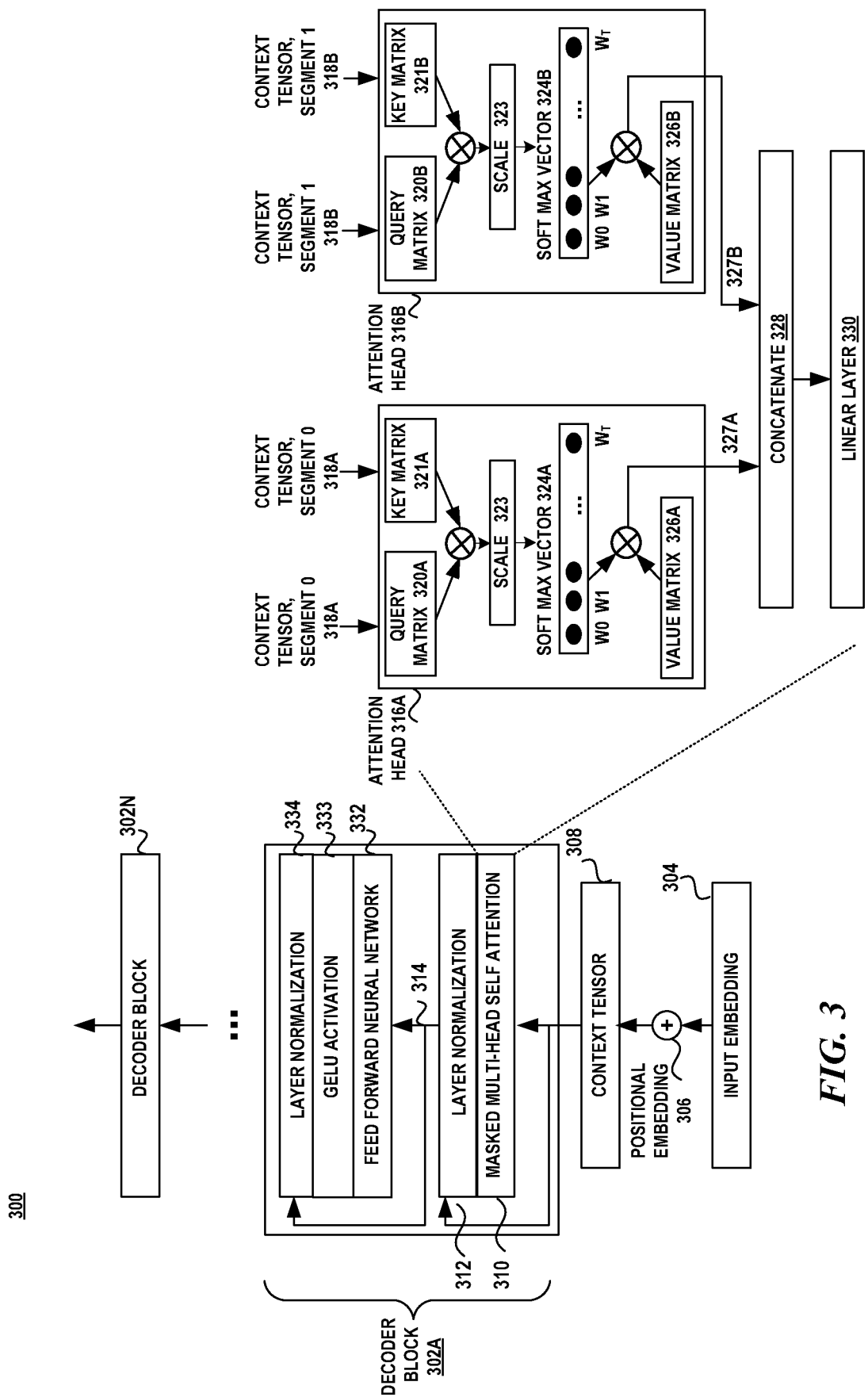
FIG. 3 is a schematic diagram illustrating an exemplary architecture of the decoder neural transformer block.

FIG. 3 shows one aspect 300 of a configuration of the neural transformer model with attention having multiple decoder blocks, 302A-302N ("302"). The decoder blocks 302 are stacked so that the output of one decoder block is input into another decoder block. The input to the first decoder block 302A is formed in a context tensor 308 and composed of an input embedding 304 and its positional embedding 306.

A decoder block 302 predicts each subtoken $t_i$ in the target language one-by-one at each time step conditioned on all previously-generated target subtokens $t_i \ldots t_{t-1}$. A decoder block 302 consists of three layers. The first layer includes a masked multi-head self-attention component 310 followed by a layer normalization component 312. The output of the layer normalization component 314 is input into the feed forward neural network 332 with a residual connection to layer normalization component 334. The third layer includes a feed forward neural network 332 followed by a Gaussian Error Linear Unit (GELU) activation layer 333 and a layer normalization component 334.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The neural transformer model takes the sequence x as the input and then converts the sequence into input vectors $H^0$. For each subtoken, a context tensor is formed from its corresponding subtoken and positional embeddings. The neural transformer model applies N decoder blocks over the context tensor to produce a contextual representation, $H^n = \text{decoder}_n(H^{n+1})$, $n \in |1, N|$. Each decoder block 302 applies a multi-headed self-attention operation followed by a feed forward layer over the input $H^{m-1}$ in the n-th layer. At the n-th decoder block, the output $H^n$ of the multi-headed self-attention component is computed as:

$$Q_i = H^{m-1} W_i^Q, K_i W_i^K = H^{m-1} W_i^K, V_i = H^{m-1} W_i^V,$$

$$\text{head}_i = \text{softmax}((Q_i K_i^T)/\sqrt{d_k} + M) V_i$$

$$H^n = [\text{head}_1; \ldots ; \text{head}_n] W_n^O$$

where the previous layer's output $H^{n-1} \in \mathbb{R}^{|X| \times dh}$ i is linearly projected to a triplet of queries ($Q$), keys (K), and values (V) using model parameters $W_i^Q, W_i^K, W_i^V \in \mathbb{R}^{dh \times dk}$ respectively, where u is the number of heads, $d_k$ is the dimension of a head, and $W_n^O \in \mathbb{R}^{dh \times dh}$ is the model parameters, $M \in \mathbb{R}^{|X| \times |X|}$ is a mask matrix, where $M_{ij}$ is 0 if i-th token is allowed to attend j-th token, otherwise $-\infty$.

The masked multi-head self-attention component 310 receives the input embeddings as key (K), value (V) and query (Q) inputs. The output of the self-attention layer 310 is a weighted sum of the values, where each weight is computed as a compatibility score of a query given the corresponding key. The masked multi-head self-attention component 310 uses a causal mask, forbidding input embedding i to attend to an input embedding j having j>i, i.e. from the future. Each self-attention head 316A, 316B performs the scaled dot-product attention operation: Attention(Q,K, V)=softmax($Q*K^T\sqrt{d_k}$)*V, where $d_k$ is the dimension of the keys and queries.

In one aspect of the disclosure, the masked multi-head self-attention layer 310 consists of multiple attention heads, such as 316A, 316B. The self-attention heads run through the scaled dot product attention, Attention (Q,K,V), multiple times in parallel. Each attention head 316A, 316B operates on a portion of the context tensor 308. Attention head 316A operates on a first segment 318A and attention head 316B operates on a second segment 318B. Each attention head 316A, 316B operates on an input sequence $x=(x_1, \ldots, x_n)$ of n elements and computes anew sequence of the same length $z=(z_1=, \ldots, z_n)$. Each output element $z_i$ is computed as a weighted sum of linearly transformed input elements:

$$z_i = \Sigma_{j=1}^n \alpha_{ij}(x_j W^V).$$

Each weight coefficient is computed using the softmax function as follows:

$$\alpha_{ij} = \frac{\exp e_{ij}}{\sum_{k=1}^n \exp e_{ik}},$$

where $e_{ij}$ is the scaled dot product $$e_{ij} = \frac{(x_i W^Q)(x_j W^K)^T}{\sqrt{d_Z}},$$

where $d_Z$ is the dimension of z.

The input into each attention head 316A, 316B consists of a query matrix 320A, 320B and a key matrix 321A, 321B, both of dimension, $T \times d_x$, where T is the code sequence length and dx is the embedding dimension. A dot product is generated from a respective query matrix 320A, 320B with all the keys from a respective key matrix 321A, 321B which is scaled by dividing each element of the resulting matrix by the square root of the segment or head size. The softmax function is applied to the scaled dot product to obtain the weights, $W_0 \ldots W_T$, 324A, 324B. The value matrix 326A, 326B is multiplied by the softmax matrix 324A, 324B producing matrices 327A, 327B. The resulting values 327A, 327B are then concatenated 328 and then linearized 330. The concatenation layer 328 takes $T \times d_v$ dimensional key matrices from each attention head to form a $T \times d_v$ dimensional matrix. The linear layer 330 takes the output of the concatenation layer 328 and applies a linear transformation according to: output=input·$W^T$+b, where the input is a $T \times d_v$ matrix, W is a $d_v \times d_v$ dimensional matrix, b is a $T \times d_x$ dimensional matrix, and output is the $T \times d_x$ dimensional matrix obtained as a result of matrix multiplication and addition. Layer normalization 312 is then applied to the output of the masked self-attention layer 310 which is then forwarded to the feed forward network layer 332.

The GELU activation 333 is an activation function that scales the output of the feed-forward neural network for the layer normalization layer 334. The GELU is defined as follows: GELU(x)=0.5×(1+tanh (√2/π(x+0.044715x³))). The GELU activation function 333 is used to achieve faster and better convergence that a sigmoid function and to avoid the vanishing gradient problem.

A layer normalization component 312, 318, 324 is used between the layers in order to normalize the inputs across the features. The training of a neural network is a time-consuming task and layer normalization is used to reduce the training time by normalizing the inputs across the features.

Each token/subtoken flows through all the decoder blocks 302 along its own path. The decoder block 302 predicts each subtoken t, in the target language one-by-one at each time step conditioned on all previously-generated target subtokens $t_1, \ldots t_{i-1}$.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
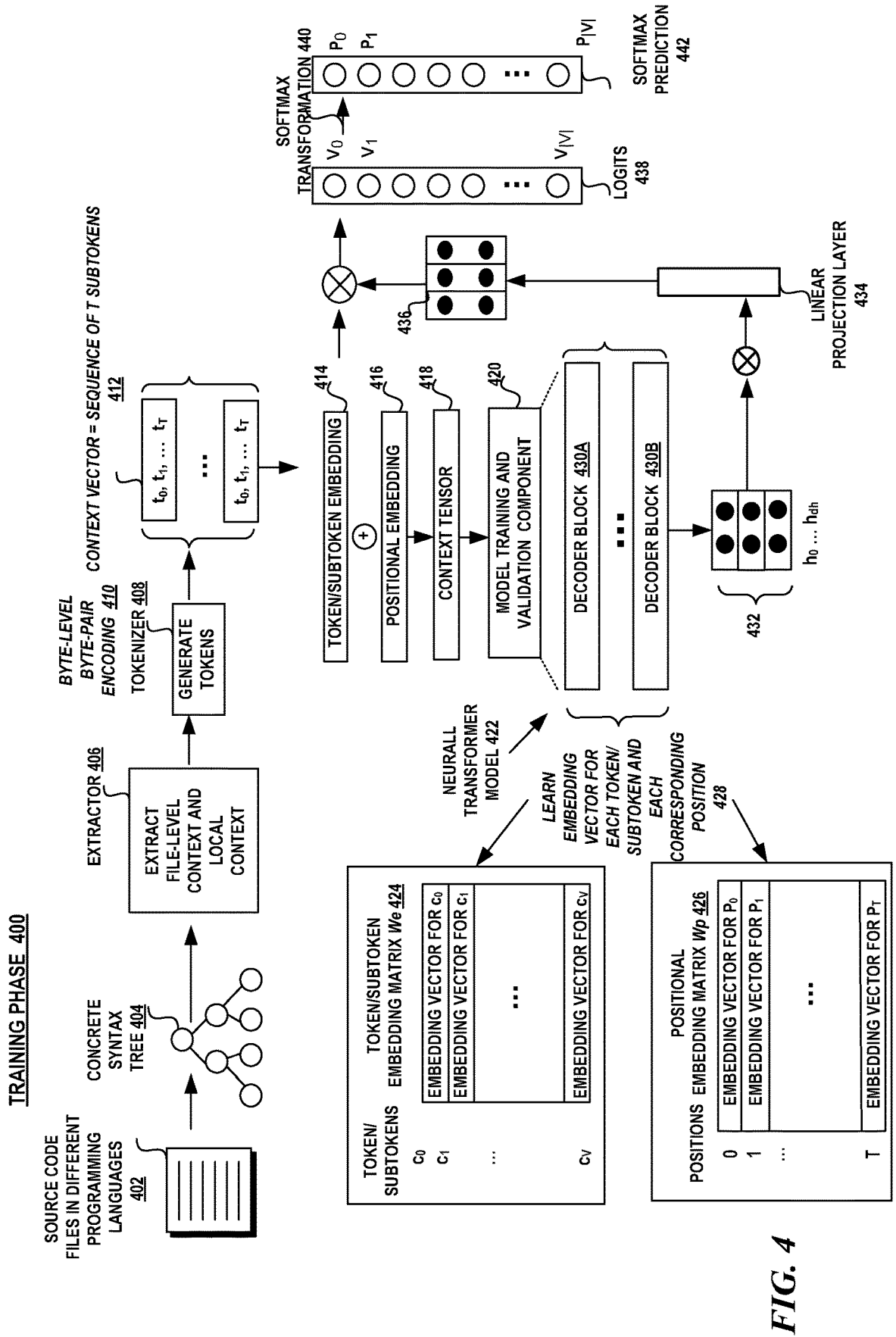
FIG. 4 is a schematic diagram illustrating an exemplary architecture and process flow of the training phase.

FIG. 4 illustrates one aspect of the training phase of the neural transformer model 400. Each selected source code file 402 is parsed into a concrete syntax tree 404. A concrete syntax tree 404 represents the syntactic structure of a program in a hierarchical or tree structure. The concrete syntax tree 404 is an n-ary tree data structure that includes nodes that represent a construct in the grammar of the programming language of a program. The concrete syntax tree 404 includes one root node, multiple internal nodes, and multiple terminal nodes. The terminal nodes represent the tokens. A token is a symbol that represents an operand or an operator. The concrete syntax tree 404 differs from an abstract syntax tree where the terminal nodes represent operands.

The concrete syntax tree 404 for a selected source code program 402 is passed to an extractor 406. The extractor 406 parses the concrete syntax tree 404 of each source code program and extracts the features from the concrete syntax tree. As noted above, the features include the file-level context (e.g., global context, the class context, the method context, function context) and a local context used in a source code file.

In one aspect, the length of a sequence includes 1024 subtokens which consists of 256 tokens from the file-level or extended context and 768 subtokens from the local context. The file-level context includes the global context (e.g., import statements, global variables), the class context (e.g., class signature, decorator, docstring), method context (e.g., decorator, method signature, docstring), and/or function context (e.g., function signature, decorator, docstring). The local context includes the method body, function body or stand-alone code blocks.

For each method body, function body, and stand-alone code block, subsequences of 768 subtokens are extracted. The file-level context or extended context is prepended or concatenated to the 768 subtoken sequence consisting of a truncated sequence of 256 subtokens. In the case of a function, the token sequence would consist of an extended sequence including a global context and function signature prepended to a local context including the function body. In the case of a method, the extended context token sequence would consist of a global context, class context, and method signature and the local context includes the method body. In the case of the stand-alone code used in main methods, the extended context includes the global context and the local context includes the stand-alone code.

A tokenizer 408 outputs a sequence of T tokens and/or subtokens from the features. In one aspect, byte pair encoding 410 is used as the tokenizer. Byte pair encoding is used to build a vocabulary of tokens/subtokens. Although its name uses the word "byte", byte pair encoding operates on Unicode code points and not byte sequences. This encoding technique partitions less-occurring tokens into subtokens and the more frequently occurring tokens are left intact. The tokenizer performs byte pair encoding to extract frequently-occurring tokens and to extract subtokens from less-occurring tokens. A subtoken is a portion of a token.

For example, the following line of source code:

loss=tf.reduce_sum(tf.square(linear_model−y))

can be partitioned into the following sequence of tokens/subtokens, each of which are separated by the character "|".

loss|=|tf|·|red|uce|_|sum|(|tf|·|squ|are|(|lin-ear|_|model|−|y|)|)|

In this example, the token "reduce" has been split into the subtokens "red" and "uce" and the token "square" has been split into the subtokens "squ" and "are".

The tokens and subtokens of each line of source code are then aggregated into an ordered sequence of token/subtokens consisting of T token/subtokens 412. In one aspect, T is 1024 tokens with each sequence consisting of 1024 token/subtokens and representing a particular context of the source code program.

The T-ordered sequences of tokens 412 are then mapped into numeric vectors and then into an embedding. An embedding is a learned representation for the text-based tokens/subtokens where tokens or subtokens that have a common meaning have a common representation. There is an embedding for each token/subtoken 414 in the vocabulary and a position embedding 416. The token/subtoken embedding 414 represents the learned representation for the token/subtoken. The neural transformer model does not read each token/subtoken sequentially and as such, has no knowledge of the token/subtoken's position in a sequence without additional position information. The position embedding 416 is used to embed position information about a token/subtoken's position in a sequence into the transformer model.

Initially, random values are used for the initial values of each token/subtoken embedding and positional embedding. Thereafter, the neural transformer model 422 learns the values for each embedding. Upon the completion of the training phase, the embeddings for each token/subtoken and the position embeddings are saved into respective matrices 424, 426 for later use in the interference phase. There is a token/subtoken embedding matrix, $W_e$, 424 that contains an embedding vector for each token/subtoken $C_i$, i=0 . . . V, and a positional embedding matrix, $W_p$, 426 that contains an embedding vector $P_j$, j=0 . . . T, for each position, where V is the size of the vocabulary and T is the length of the token/subtoken sequence.

Each token/subtoken embedding 414 and its corresponding positional embedding 416 are combined to form a context tensor 418. A tensor is a mathematical object that has indices and components that follow certain transformation rules. The tensor is a partially defined computation. It is a generalization of vectors and matrices and represented as an n-dimensional array. The tensor in this instance represents a context of a source code program. The size of the context tensor 418 is T×size of the embedding vector (e.g., embedding size), where T is the length of the token/subtoken sequence.

Each sequence is input into the model training and validation component 420 to train the neural transformer model 422. The token/subtoken embeddings 414 are learned together with the parameters of the neural transformer model 422. In order to reduce the number of parameters in the neural transformer model 422, weight tying is used. In some aspects, weight tying can reduce the number of parameters by 50%. Weight tying reuses the input embedding as the output classification matrix. This is achieved by use of the linear projection layer 434 (i.e., linear projection matrix) and the predicted embedding matrix 436.

The output hidden state of neural transformer model 432 is multiplied by the linear projection matrix A 434 thereby generating the predicted embedding matrix 436. The linear projection matrix A 434 is defined as $A=a_{ij} \in R^{dh \times dx}$. The hidden state vector $h_T \in R^{dh}$ encodes information learned by neural transformer model 422 from the context tensors 418. The predicted embedding matrix 436 is multiplied by the input embeddings 414, 416 generating unnormalized logits predictions 438 as $y_k = \Sigma_j l_{kj} l_j^{pred} + b_k$, where $b_k$, k=0 ... |V|−1 is the bias vector. A probability distribution for each token/subtoken $P_{|V|}$ 442 is generated by normalizing the logits 438 using the softmax function or transformation 440.

Figure 5:
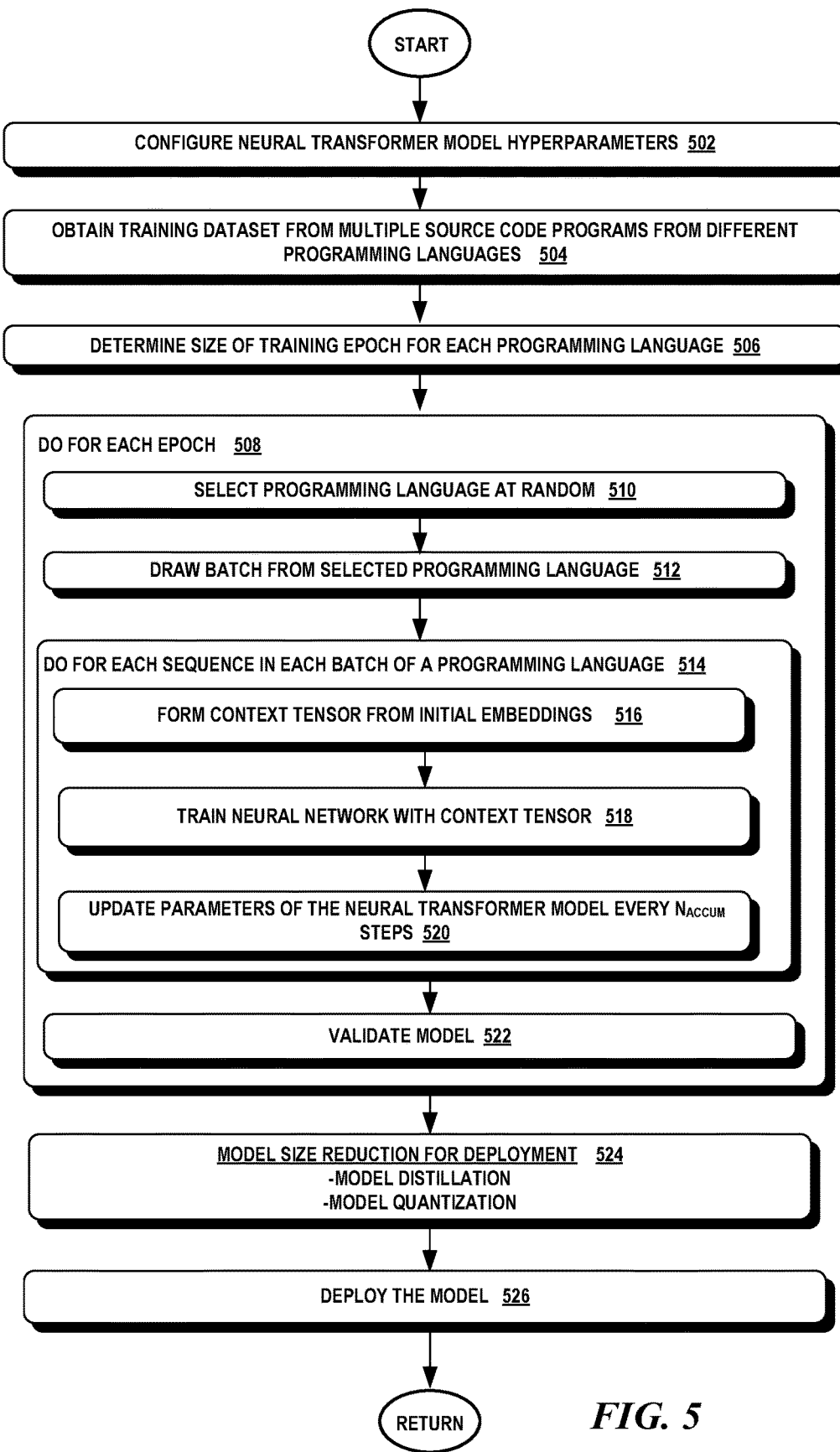
FIG. 5 is a flow chart illustrating an exemplary method for training the neural transformer model.

FIG. 5 illustrates the overall training phase of the neural transformer model 500. Neural networks are trained iteratively, making multiple passes over the training dataset before converging to a minimum. An epoch represents the entire training dataset passed forwards and backwards through the neural network once. Since the training dataset is very large, it is partitioned into smaller batches. The training is iterative and the entire dataset is passed through the neural network in multiple iterations. Each training iteration includes forward propagation, loss calculation, backpropagation steps followed by updating the weights.

The neural network has multiple layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

Initially, the neural network model is configured with the hyperparameters (block 502). In one aspect, the hyperparameters may include the following: (1) token/subtoken and position embedding layers of dimensions: 30000×768, and 1024×768 respectively; (2) twelve decoder blocks, with each block consisting of twelve masked self-attention heads, feed forward neural network and layer normalization layers; (3) for the training procedure: auto-regressive, with a cross-entropy loss optimization objective; the sequence length is 1024 tokens/subtokens; the mini-batch size is 8; the gradient accumulation steps for each weight update is 8; the Adam stochastic optimization procedure is used to train the neural network; and the learning rate is 0.0001; (4) the data normalization procedure: normalize all string and numerical literals, keeping the ten most frequent; and (5) the vocabulary encoding procedure: extract joint subtoken vocabulary from the multi-lingual code corpus using byte-pair encoding, preserve the ten most frequent string and numerical literals encoding them as a single token during byte-pair encoding procedure; and introduce special control flow tokens to denote end-of-line, end-of-file, decent, and indent symbols. (Collectively, block 502).

Next, training datasets having sequence of tokens representing features extracted from multiple source code files in different programming languages are obtained (block 504). In training a neural transformer model with source code written in different programming languages, there may be an imbalance in the size of the training dataset for each programming language. For example, there may be 80 times more training data for the C programming language than in the TypeScript programming language. This imbalance might affect the accuracy of the predictions made by the model. In order to compensate for this imbalance, the training algorithm increases the number of samples of the data-poor programming languages uniformly at random without replacement during training.

Datasets for each programming language are represented as iterators over a set of training samples shuffled at random. Each call to an iterator returns the next element of the training set, or throws an exception if no elements are left to return, in which case the training set in a given programming language is shuffled, and the iterator is re-started. In one aspect, for each training iteration the following process is used: (1) select a programming language at random; (2) draw a batch of data from the corresponding training dataset at random without replacement (by calling to training iterator), if no sufficient data are available in a selected programming language, the epoch is concluded, and (3) restart training iterator, and begin the next pass over the entire dataset in this programming language. We repeat steps (1)-(3) until a number of steps equivalent to the size of the smallest dataset in one programming language multiplied by the number of programming languages in the training set has been performed.

Given a set of programming languages $\{l_i\} i=0 \ldots L$ and corresponding numbers of training samples $\{n_j\}, j=1 \ldots L$ in each programming language. An effective training epoch is defined as L×min ($\{n_j\}, j=1 \ldots L$). For each minibatch iteration of each epoch, a programming language $l_i$ at random with replacement. For the selected programming language $l_i$, draw a mono-lingual minibatch of data at random without replacement. If a complete pass over the dataset for language L is finished, reshuffle the dataset and draw a sample. If the number of training iterations completed is divisible by L×min ($\{n_j\}, j=1 \ldots L$), (which is the number of training languages multiplied by the number of samples in the training iterator for a programming language of the smallest size) Repeat until we have made at least one pass over max ($\{n_j\}, j=1 \ldots L$) (which is the number of samples in the training iterator for a programming language of the largest size).

The size of the training epoch is configured for each programming language (block 506). The size may be L x min ($\{n_j\}, j=1 \ldots L$), where L is the number of programming languages used in the training dataset (block 506). At each epoch (block 508), a programming language is selected at random (block 510). A batch of the training dataset of the selected programming language is obtained (block 512). For each sequence in the batch (block 514), a context tensor is formed from the initial embeddings (block 516) and the context tensor is applied to the neural transformer model as explained above with respect to FIG. 4 (block 518).

The neural transformer model is trained iteratively, making multiple passes over the training dataset before converging to a minimum. Each training iteration includes forward propagation, loss calculation, backpropagation steps followed by updating the weights by calculating the weight gradients (block 518).

The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as close as possible to zero using a gradient descent technique. In one aspect, a Stochastic Gradient Descent (SGD) method is the optimization algorithm used to find the values of parameters of the function that minimizes the loss function. A backpropagation through time (BPTT) algorithm maybe used to update the weights. (Collectively, block 518).

At the completion of each batch, the parameters of the neural network are updated at a preconfigured frequency denoted as $N_{ACCUM}$. $N_{ACCUM}$ is a gradient accumulation frequency and in one aspect has a value of 8. The parameters include the token/subtoken embeddings, the positional embeddings which are stored in a respective embedding matrix. Other parameters include the parameters of the attention layers and the feed forward neural network layers. (Collectively, block 520).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. (Collectively, block 522).

Evaluation metrics are used to test the quality of the candidate recommendations. In one aspect, a top-k accuracy method is used using mean reciprocal rank (MRR) to perform the evaluation. Top-k accuracy is defined as:

$$Acc(k) = \frac{N_{top-k}}{Q},$$

and MMR is defined as:

$$MRR = \frac{1}{Q}\sum_{i=1}^{Q}\frac{1}{rank_i},$$

where $N_{top-k}$ denotes the number of relevant recommendations in the top k suggestions, $Q$ represents the total number of test data samples, and rank, is the prediction rank of a recommendation.

Accuracy in the top-1 indicates how often the top recommendation is correct, while the top-5 accuracy indicates how often the top three recommendations in the list contain the candidate the user is looking for. The MRR captures the rank of the result, thus providing information outside of the top candidate. A larger value of the MRR indicates the overall smaller rank numbers of correct recommendations. (Collectively, block 522).

Upon completion of the model validation, techniques are used to reduce the model size prior to deployment. A neural transformer model consists of a lot of parameters known as weights. The expense of using a neural transformer model is costly since it consumes a significant amount of computing power to train and use. In order to reduce this expense, techniques are used to reduce the model size. Model distillation and model quantization are two such techniques. (Collectively, block 524).

Model quantization is a technique that converts continuous data that is infinitely large within a fixed range such as converting floating point numbers to fixed point integers. Model quantization is applied to each layer of the neural transformer model to convert the floating-point values of the weights to fixed integers. Model distillation is a model compression technique where a smaller model is trained to behave like the larger model. (Collectively, block 524).

Upon completion of the model size reduction techniques, the neural transformer model is ready to be deployed in a code completion system (block 526).

Attention now turns to a description of the components of the neural transformer model used in the inference phase. The inference phase utilizes a beam search to find the most likely candidate sequences. A beam search iteratively generates tokens/subtokens by invoking the neural transformer model. The output of the neural transformer model is a matrix of token probabilities for each position in a candidate sequence. The beam search concentrates on the k most probable tokens at each iteration to get the best path to the most likely candidate sequence. At each iteration, each of the k most probable tokens are concatenated with the tokens in the preceding iterations to form a partial candidate sequence.

A beam search uses a breadth-first search to build a search tree. The search tree is composed of nodes at one or more inference levels. Each node represents a probability distribution generated by the neural transformer model for the tokens/subtokens in the model vocabulary. At each level, only the top k tokens/subtokens having the highest probabilities from the output distribution generated by the neural transformer model are expanded to the next inference level. The variable k is preconfigured and also referred to as the beam width. Each of the k subtokens/tokens is then expanded into a search that updates the current context sequence with the selected subtoken/token to input into the neural transformer model to generate an additional probability distribution for the next token in a sequence. This process is repeated until the end-of-line token is predicted as being the next likely token candidate.

Figure 6A:
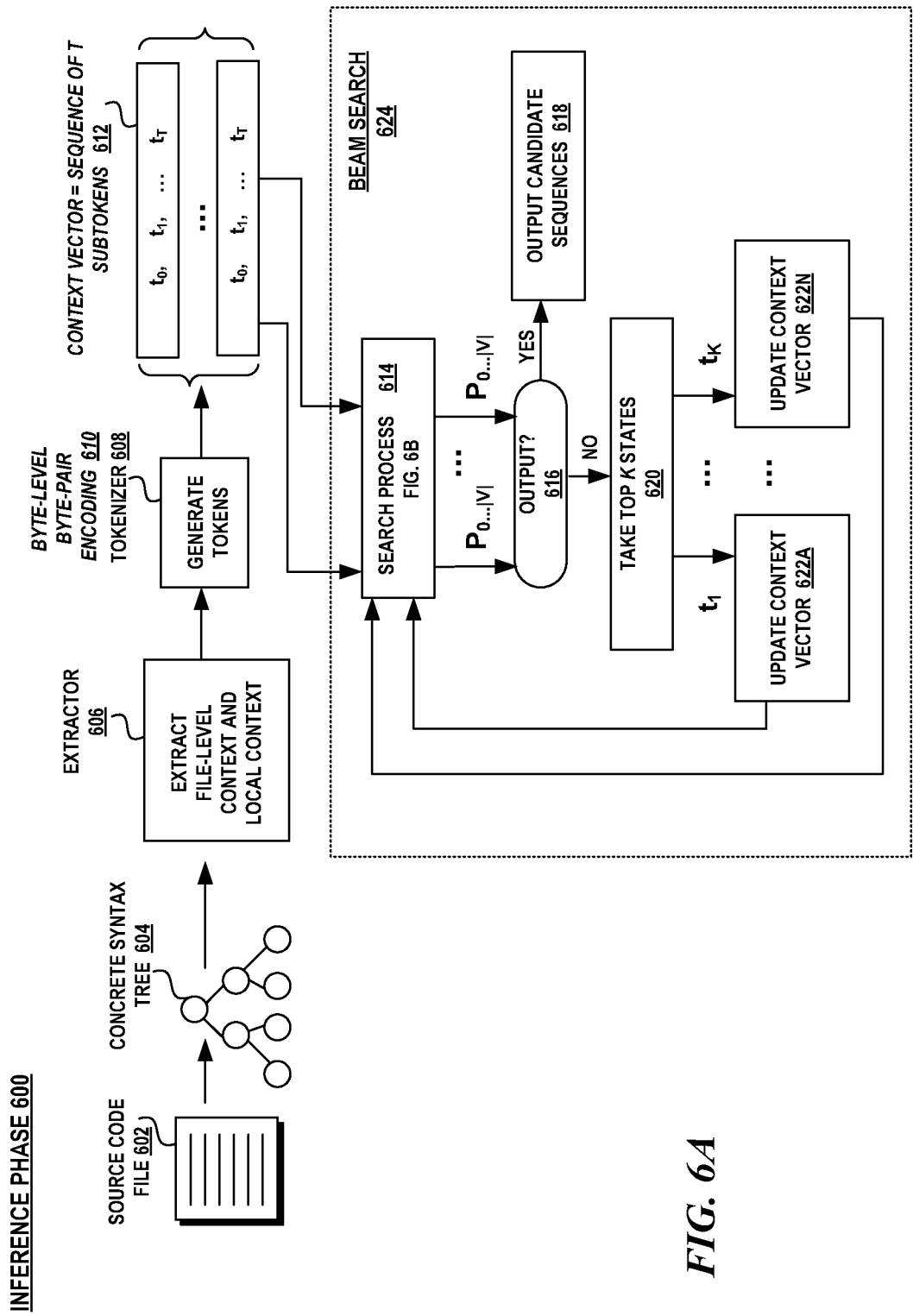
FIGS. 6A-6B are schematic diagrams illustrating an exemplary architecture, method, and process flow of the inference phase.

Turning to FIG. 6A, there is shown exemplary components and an exemplary process of the inference phase 600. A source code file 602 is transformed into a corresponding concrete syntax tree 604. The concrete syntax tree 604 is traversed, by the extractor 606 to obtain the features which include the file-level context (e.g., the global context, the class context, function context, and/or the method context) and the local context of the source code at issue. In one aspect, the context window of the transformer model consists of 1024 subtokens consisting of 256 subtokens from the file-level or extended context and 768 subtokens of a local context that immediately precedes the cursor position.

The extracted features are passed to the tokenizer 608 which extracts tokens that are then encoded using byte-level byte pair encoding 610 to generate ordered sequences of length T which are then vectorized 612. The beam search 624 uses the context vector 612 to initiate a search process 614 that relies on the probability distribution generated from the neural transformer model, $P_0 \ldots P_{|V|}$.

Figure 6B:
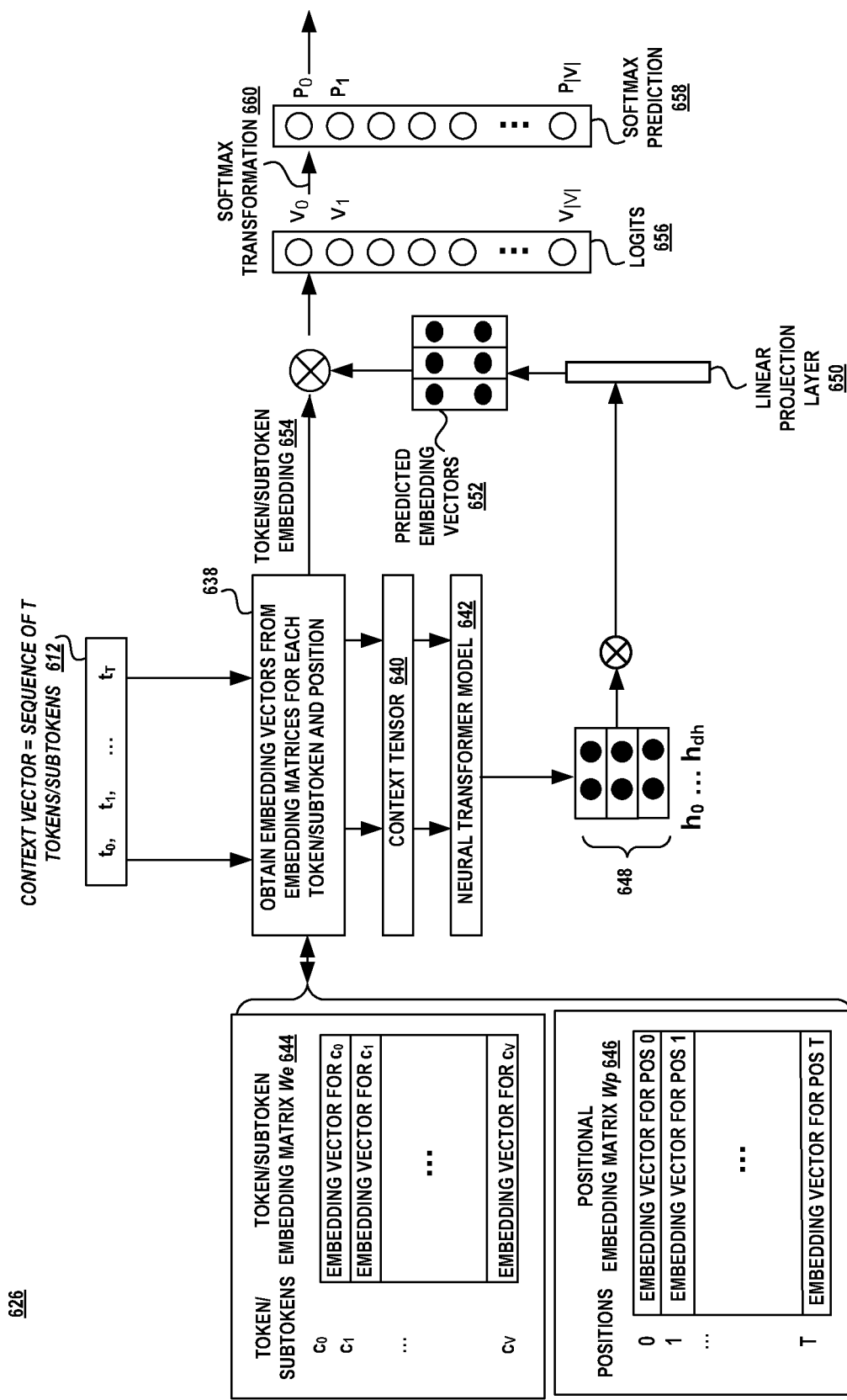

Turning to FIG. 6B, an embedding vector for each token and subtoken 638 for sequence 612 is obtained from the token/subtoken embedding matrix 644 and its corresponding positional vector from the positional embedding matrix 646. The token/subtoken embedding vector and its corresponding positional embedding vector are combined to form a context tensor 640 which is input into the neural transformer model 642.

The output of the neural transformer model 642 is a vector with components $h_0 \ldots h_{dh}$ 648. The output of the transformer is multiplied by the linear projection layer 650 to generate the predicted embedding vectors 652. The token/subtoken embedding vectors 654 are used as the output classification matrix to generate the unnormalized predictions or logits $V_0 \ldots V_{|V|}$ 656. The logits 656 are normalized using the softmax transformation 660 to generate the softmax prediction 658 $P_0 \ldots P_{|V|}$.

Turning back to FIG. 6A, if the probability distribution, $P_0 \ldots P_{|V|}$, indicates that an end-of-line token is the most likely token to follow in a partial candidate sequence (block 616-yes), then the top k candidate sequences are output (block 618). Otherwise, the beam search 624 takes the top k states or tokens/subtokens identified from the probability distribution generated by the neural transformer model in the inference process (block 620). A new context vector is generated for each of the k states, $t_1, \ldots t_k$, using the new token/subtoken in the context vector (blocks 622A, 622B). The new context vector represents the output embedding shifted to the right by one token. The new context vectors are then input into the inference process (blocks 622A, 622B, 614). The beam search 624 ends when the end-of-line token is selected as the most likely candidate to complete a partial candidate sequence.

Attention now turns to a discussion of the usage of the neural transformer model for code completion.

Code Completion

Figure 7:
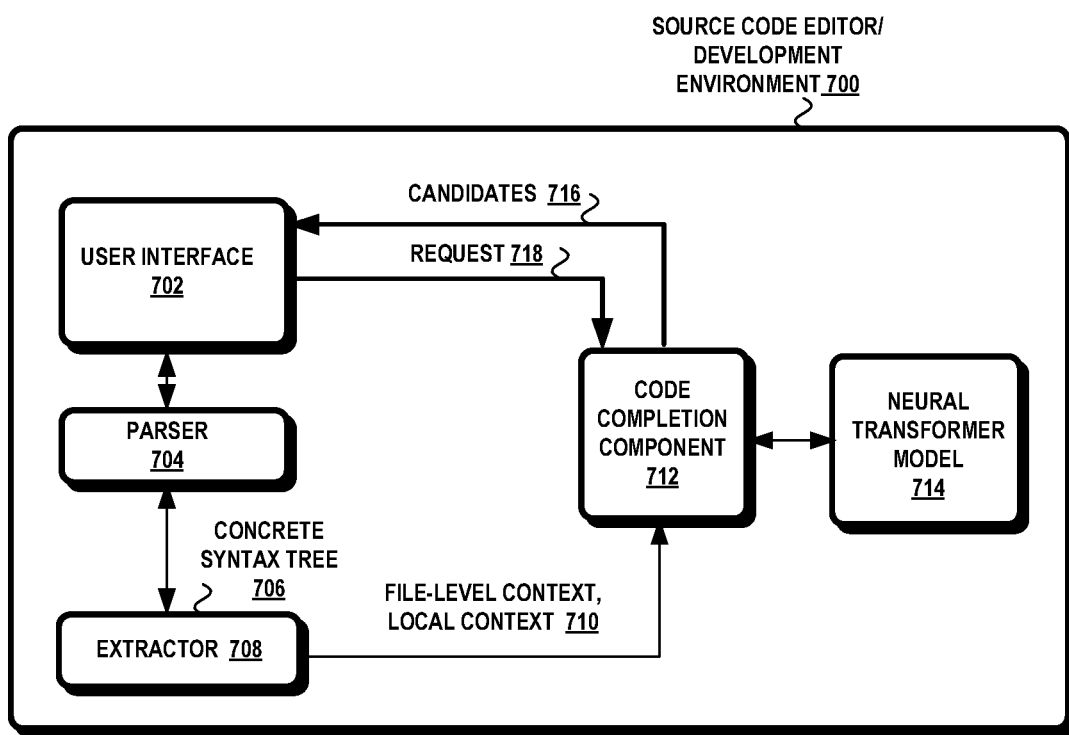
FIG. 7 is a schematic diagram illustrating an exemplary code completion system utilizing the neural transformer model.
Figure 8:
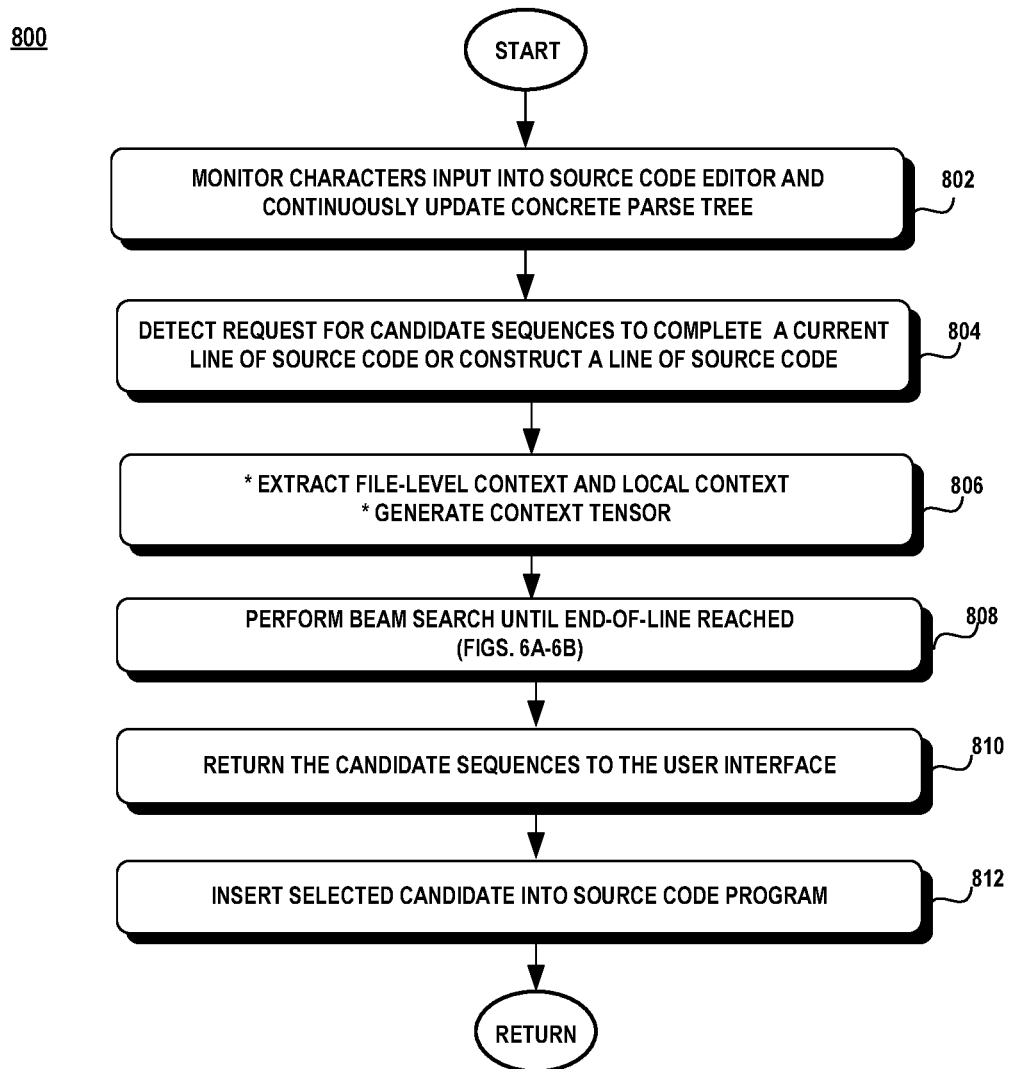
FIG. 8 is a flow diagram illustrating an exemplary method for code completion.

Referring to FIG. 7, code completion is performed in a development environment such as a source code editor 700 or integrated development environment (IDE). The source code editor 700 is configured to interact with a code completion component 712 that performs a beam search that utilizes the neural transformer model 714. The source code editor 700 performs a background parsing process using parser 704 that monitors the characters input into the source code editor 700 and continuously parses the source code to update the concrete syntax tree 706 representing the source code of the current line of code (block 802).

The user interface 702 of the source code editor 700 detects a request 718 for candidate sequences to finish the current line of source code. The request 718 may be initiated by a marker character, such as an equal sign "=", in which the code completion system will provide candidate sequences 716 to complete the rest of the expression after the equal sign. (Collectively, block 804).

Alternatively, the user may request candidates by entering a particular keystroke or sequence of keystrokes, such as the combination of the CTRL key with the whitespace key. In yet another aspect, the system may automatically display, in a dimmed color, a single top candidate at the end of the current source code line regardless of a marker character. The system builds and continuously updates a tree of candidates in the background regardless of whether the user decides to trigger the candidate or not. The candidate is automatically displayed in the user interface when the user has been idle for a period of time. (Collectively, block 804).

If the user wants to accept the candidate, the user may type in a particular keystroke or combination of keystrokes (e.g., CTRL and I) to accept the candidate. In this case, the cursor position will advance to the end of the suggested code sequence and the dimmed color of the candidate code will change to the normal color of the code. If the user does not want to use the candidate, the candidate disappears when the user continues typing. In this case, the system would refine the code sequence based on the pre-fix filter of the tree of candidates based on the newly typed code. (Collectively, block 804).

Upon detection of the request for a candidate sequence, the concrete syntax tree is parsed by the extractor 708 to obtain the file-level context and local context from the current code segment 710. Embeddings are obtained from the token/subtoken embedding matrix and the positional matrix. A context tensor is generated from the embeddings. (Collectively, block 806).

A beam search is then performed until the probability distribution indicates that the next likely token is the end-of-line token as shown above with respect to FIGS. 6A-6B (block 808). The beam search keeps track of the generated sequences in the search tree and returns the top candidate sequences to the user interface component for display to the user (block 810). A user may select one of the candidates which is then input into the source code program to complete the line of source code (block 812). Alternatively, the user may disregard the candidate sequences and continue typing. The process is repeated (blocks 802-812) until the user closes the source code program, exits the source code editor or terminates the code completion tool.

Exemplary Operating Environment

Figure 9:
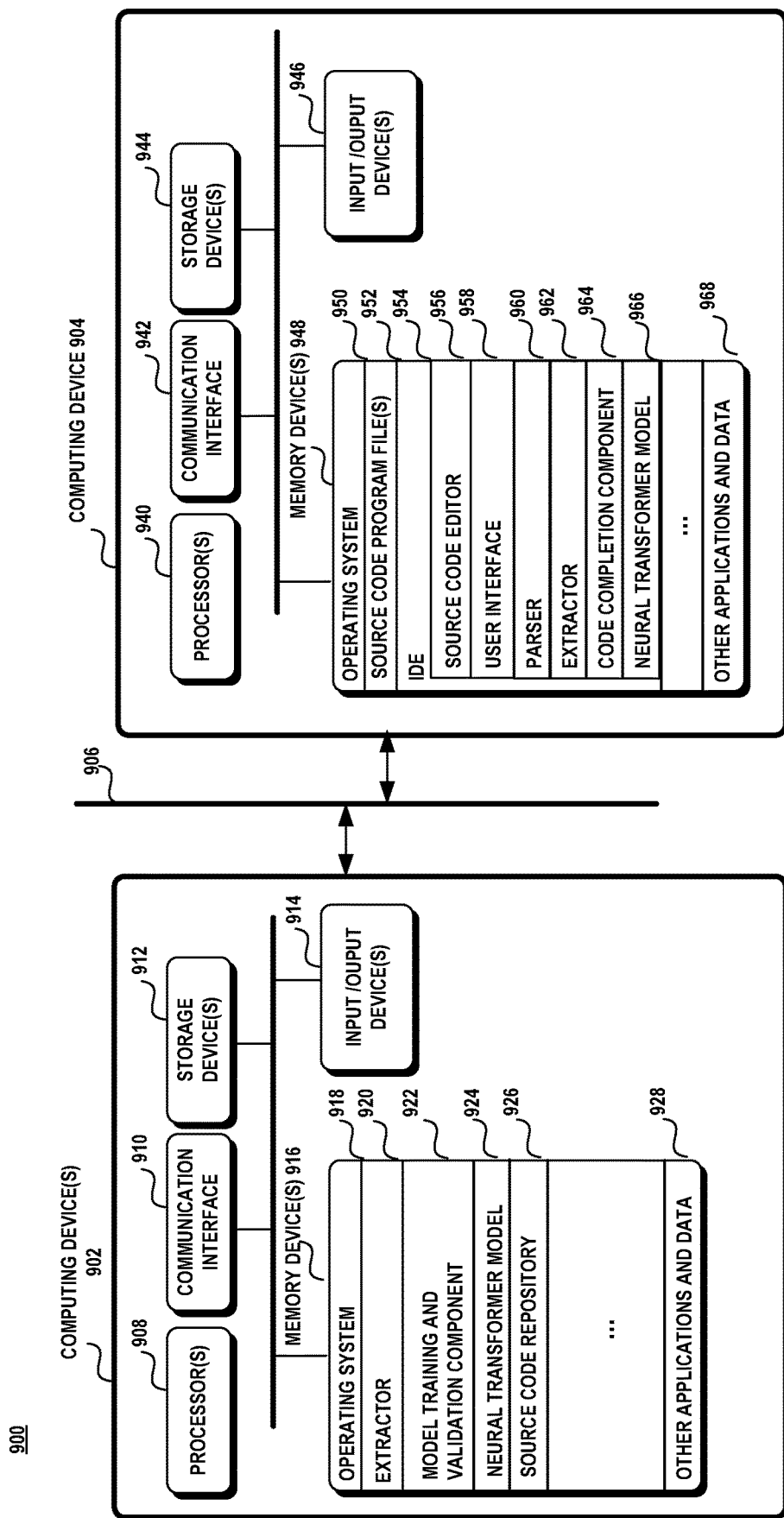
FIG. 9 is a block diagram illustrating an operating environment.

Attention now turns to a discussion of an exemplary operating environment. FIG. 9 illustrates an exemplary operating environment 900 in which one or more computing devices 902 is used to train the neural transformer model and a second computing device 904 uses the neural transformer model for code completion. However, it should be noted that the aspects disclosed herein is not constrained to any particular configuration of devices. Any one of the computing devices 902, 904 may utilize the neural transformer model in its own code completion system and computing device 904 may generate and test the neural transformer model as well. Computing devices 902 may be configured as a cloud service that generates the neural transformer model as a service for other code completion systems. It should be noted that the operating environment is not limited to any particular configuration and other configurations are possible.

The computing devices 902, 904 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

The computing devices 902, 904 may include one or more processors 908, 940, one or more communication interfaces 910, 942, one or more storage devices 912, 944, one or more input/output devices 914, 949, and one or more memory devices 919, 948. A processor 908, 940 may be any commercially available or customized processor and may include dual microprocessors and multi-processor architectures. A communication interface 910, 942 facilitates wired or wireless communications between the computing device 902, 904 and other devices. A storage device 912, 944 may be computer-readable medium that does not contain propagating signals, such as modulated data signals transmitted through a carrier wave. Examples of a storage device 912, 944 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 912, 944 in the computing devices 902, 904. The input/output devices 914, 946 may include a keyboard, mouse, pen, voice input device, touch input device, display, speakers, printers, etc., and any combination thereof.

A memory device 916, 948 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 916, 948 may also include one or more external storage devices or remotely located storage devices that do not pertain to propagated signals, such as modulated data signals transmitted through a carrier wave.

Computing device 904 may utilize an integrated development environment (IDE) 954 that allows a user (e.g., developer, programmer, designer, coder, etc.) to design, code, compile, test, run, edit, debug or build a program, set of programs, web sites, web applications, and web services in a computer system. Software programs can include source code files, created in one or more source code languages (e.g., Visual Basic, Visual J #, C++. C #, J #, Java Script, APL, COBOL, Pascal, Eiffel, Haskell, ML, Oberon, Perl, Python, Scheme, Smalltalk and the like). The IDE 954 may provide a native code development environment or may provide a managed code development that runs on a virtual machine or may provide a combination thereof. The IDE 954 may provide a managed code development environment using the NET framework. It should be noted that this operating embodiment is not constrained to providing the source code development services through an IDE and that other tools may be utilized instead, such as a stand-alone source code editor and the like.

A user can create and/or edit the source code program files 952 according to known software programming techniques and the specific logical and syntactical rules associated with a particular source language via a user interface 958 and a source code editor 956 in the IDE 954.

The memory device 948 of computing device 904 may contain instructions, components, and data. A component is a software program that performs a specific function and is otherwise known as a module, program, and/or application. The memory device 948 may include an operating system 950, one or more source code program files 952, an IDE 954 that may include a source code editor 956, a user interface 958, a parser 960, an extractor 962, code completion component 964, and a neural transformer model 966. In addition, the memory device 948 may include other applications and data 968.

The memory device 916 of the computing devices 902 may include an operating system 918, an extractor 920, a model training and validation component 922, a neural transformer model 924, a source code repository 926, and other applications and data 929.

The computing devices 902, 904 may be communicatively coupled via a network 906. The network 906 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 906 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A system is disclosing comprising: one or more processors; and a memory that stores one or more programs that are configured to be executed by the one or more processors, the one or more programs including instructions to perform actions that: generate a candidate to complete a line of source code of a source code program, the source code program written in a first programming language, the candidate generated by a deep learning model, wherein the deep learning model is trained to learn syntax of a plurality of programming languages, wherein the plurality of programming languages differs from the first programming language; and provide the candidate to the source code program.

In an aspect, the deep learning model is a decoder neural transformer model with attention. In an aspect, the one or more programs include further instructions that: extract a file-level context of the source code program; extract a local context of the source code program at a current cursor position; and input the file-level context and the local-context to the deep learning model to generate the candidate. In an aspect, the file-level context includes a global context, a method context, a class context and/or a function context. In an aspect, the local context includes a context of the source code program immediately preceding the current cursor position.

In an aspect, the local context includes a method body, function body or stand-alone code of a main method. In an aspect, the one or more programs include further instructions that: generate a sequence of subtokens of length T representing the file-level context and the local context, the file-level context including T/4 subtokens and the local context including 3T/4 subtokens; and inputs the sequence of subtokens of length T to the deep learning model to generate the candidate. In an aspect, the one or more programs include further instructions that: transform the sequence of subtokens of length T into a byte-level byte-pair encoding.

A method is disclosed, comprising: generating an ordered sequence of subtokens representing a context of a source code program in a source code editor at a current cursor position, the source code program written in a first programming language, the context including a file-level context and a local context; processing the ordered sequence of subtokens by a deep learning model to generate a candidate to complete a line of source code at the current cursor position, wherein the deep learning model is trained to recognize source code written in a second programming language, wherein the first programming language and the second programming language differ, wherein k partial candidate sequences are generated at each iteration of the processing using the deep learning model to predict a next subtoken for a partial candidate sequence by generating an output probability distribution of the subtokens at each iteration, wherein the processing selects top k subtokens having highest probability to complete a partial candidate sequence, wherein the processing ceases when the deep learning model predicts an end-of-line token as next subtoken for a select partial candidate sequence; and providing the select partial candidate sequence as a candidate to complete the line of source code at the current cursor position.

In an aspect, the method further comprises: forming the ordered sequence of subtokens of length T including subtokens representing the file-level context and subtokens representing the local context. In an aspect, the ordered sequence of subtokens of length T include a first sequence of subtokens of length T/4 representing the file-level context and a second sequence of subtokens of length 3T/4 representing the local context. In an aspect, the file-level context includes at least one of a global context, a class context, a method context or a function context. In an aspect, the local context includes a method body, a function body, or stand-alone code associated with a main routine. In an aspect, the deep learning model is a decoder neural transformer with attention. In an aspect, the method further comprises: transforming the sequence of subtokens of length T into a byte-level byte-pair encoding.

A device is disclosed comprising: at least one processor coupled to a memory device; wherein the at least one processor is configured to perform acts to: obtain a deep learning model trained to predict a candidate to complete a line of source code of a source code program in a source code editor, wherein the deep learning model is trained on an unsupervised training dataset of features from source code programs written in multiple programming languages; and deploy the deep learning model to predict a candidate to complete a line of source code in a first source code program, the first source code program written in a programming language outside of the multiple programming languages.

In one aspect, the deep learning model is a decoder neural transformer with attention. In an aspect, the at least one processor is configured to perform acts to: extract a file-level context of the source code program; extract a local context of a current cursor position of the source code program; and input the file-level context and local context to the deep learning model to predict the candidate to complete the line of source code. In an aspect, the file-level context includes a global context, a class context, function context, and/or a method context of the source code program. In an aspect, the local context includes a method body, function body or stand-alone code of a main routine.

What is claimed:
1. A code completion system, comprising:
a processor; and
a memory, wherein the memory comprises instructions that when executed by the processor perform actions that:
obtain a partially-formed source code snippet of a source code program;
extract a file-level context and a local-level context of the partially-formed source code snippet;
search for a source code candidate to complete the partially-formed source code snippet, wherein the search generates a plurality of partial source code candidates at each of a plurality of time steps, wherein the search utilizes a deep learning model to generate a conditional probability distribution given the file-level context and the local-level context, wherein the search uses the conditional probability distribution at each time step to predict a next token of each partial source code candidate conditioned on previously-generated tokens of a respective partial source code candidate; and
upon completion of the search, output at least one partial source code candidate as the source code candidate to complete the partially-formed source code snippet.
2. The code completion system of claim 1, wherein the deep learning model comprises a neural transformer model with attention.
3. The code completion system of claim 1, wherein the file-level context comprises a global context, a method context, a class context, and/or a function context.
4. The code completion system of claim 1, wherein the local context comprises a context of the source code program preceding the partially-formed source code snippet.
5. The code completion system of claim 1, wherein the local context comprises the partially-formed source code snippet.
6. The code completion system of claim 1, wherein the local context comprises a method body, a function body, or stand-alone code of a main method.
7. The code completion system of claim 1, wherein the code completion system is part of an integrated development environment or a source code editor.
8. The code completion system of claim 1, wherein the deep learning model comprises a decoder neural transformer model with attention.
9. The code completion system of claim 1, wherein the memory includes further instructions that when executed on the processor perform actions that:

terminate the search when an end-of-line token is predicted as a likely token to follow a partial candidate sequence.

10. A computer-implemented method for code completion, comprising:
   obtaining a partially-formed source code snippet of a source code program;
   extracting a file-level context and a local-level context of the partially-formed source code snippet from the source code program;
   searching for a source code candidate to complete the partially-formed source code snippet, wherein the search generates partial source code candidates at each of a plurality of time steps based on a conditional probability distribution generated by a deep learning model given the file-level context and the local-level context, wherein the search uses the conditional probability distribution at each time step to select a next token for each of the partial source code candidates based on previously-generated tokens of a respective partial source code candidate; and
   upon completion of the search, displaying at least one partial source code candidate as the source code candidate to complete the partially-formed source code snippet.

11. The method of claim 10, wherein the deep learning model comprises a neural transformer model with attention.

12. The method of claim 10, wherein the file-level context comprises a global context, a method context, a class context, and/or a function context.

13. The method of claim 10, wherein the local context comprises a context of the source code program preceding the partially-formed source code snippet.

14. The method of claim 10, wherein the local context comprises the partially-formed source code snippet.

15. The method of claim 10, wherein the local context comprises a method body, a function body, or stand-alone code of a main method.

16. The method of claim 10, wherein the method is performed in a code completion system of an integrated development environment or a source code editor.

17. The method of claim 10, wherein the deep learning model comprises a decoder neural transformer model with attention.

18. The method of claim 10, further comprising:
   terminating the search when an end-of-line token is predicted by the deep learning model as a most likely token to follow a partial candidate sequence.

* * * * *